United States Patent [19]

Hirose et al.

[11] Patent Number: 4,791,451

[45] Date of Patent: Dec. 13, 1988

[54] COPYING APPARATUS HAVING AUTOMATIC DOCUMENT FEEDER

[75] Inventors: Akira Hirose; Yukitaka Nakazato, both of Tokyo, Japan

[73] Assignee: Ricoh Company, Ltd., Tokyo, Japan

[21] Appl. No.: 130,214

[22] Filed: Dec. 8, 1987

[30] Foreign Application Priority Data

Dec. 11, 1986 [JP] Japan .................. 61-293400

[51] Int. Cl.$^4$ ............................ G03G 15/00
[52] U.S. Cl. ................... 355/8; 355/14 SH; 271/227; 271/265
[58] Field of Search .......... 355/3 SH, 14 SH, 7, 355/8; 271/3.1, 265, 227, 258-259

[56] References Cited

U.S. PATENT DOCUMENTS 4,440,487 4/1984 Miura ............................. 355/3 SH X
4,455,018 6/1984 Colglazier et al. ................. 271/227
4,610,533 9/1986 Takahato ........................ 271/265 X

FOREIGN PATENT DOCUMENTS 56-125763 10/1981 Japan ................... 355/14 R
57-86860 5/1982 Japan ....................... 355/8
59-42559 3/1984 Japan ................. 355/14 SH Primary Examiner—Arthur T. Grimley
Assistant Examiner—J. Pendegrass
Attorney, Agent, or Firm—Oblon, Fisher, Spivak, McClelland, & Maier

[57] ABSTRACT

A copying apparatus includes an automatic document feeder, a document size detecting part provided on the automatic document feeder for detecting a size of a document, a contact glass on which the document is set automatically by the automatic document feeder, a stopping position control device for controlling a stopping position of the document on the contact glass depending on the size of the document detected in the document size detecting part, an optical scanning device for scanning the document on the contact glass, and a scanning range control part for controlling a scanning range of the optical scanning device depending on the stopping position of the document.

15 Claims, 9 Drawing Sheets

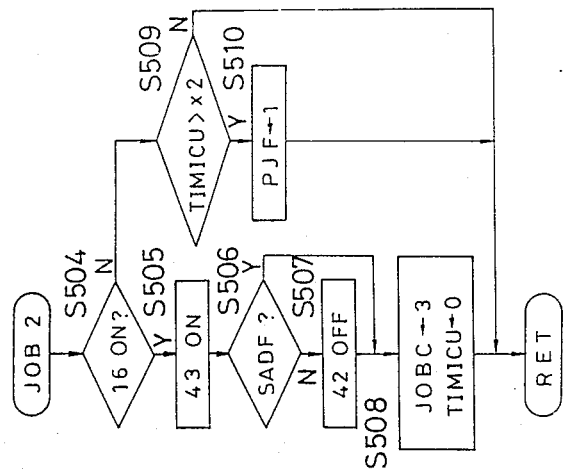
FIG 5E
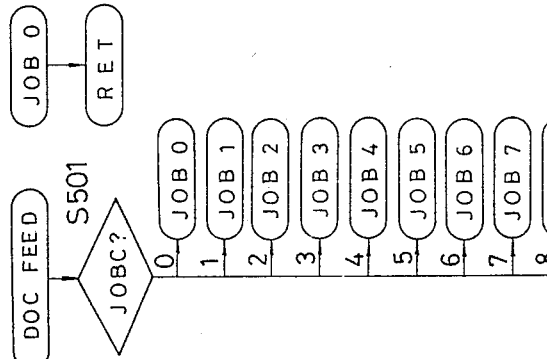
FIG 5D
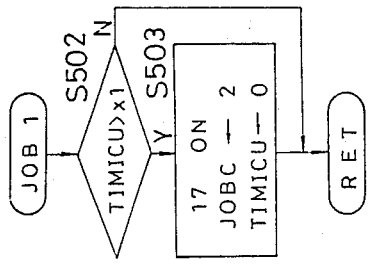
FIG 5C
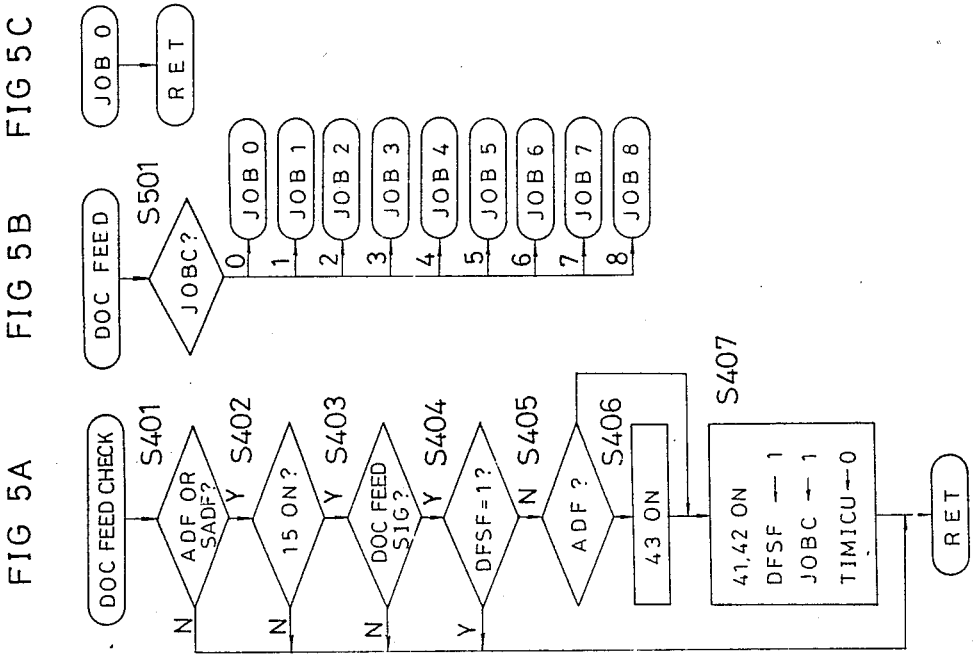
FIG 5B
FIG 5A

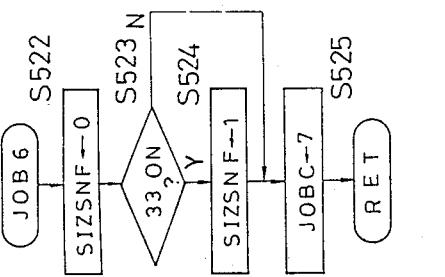
FIG. 5I
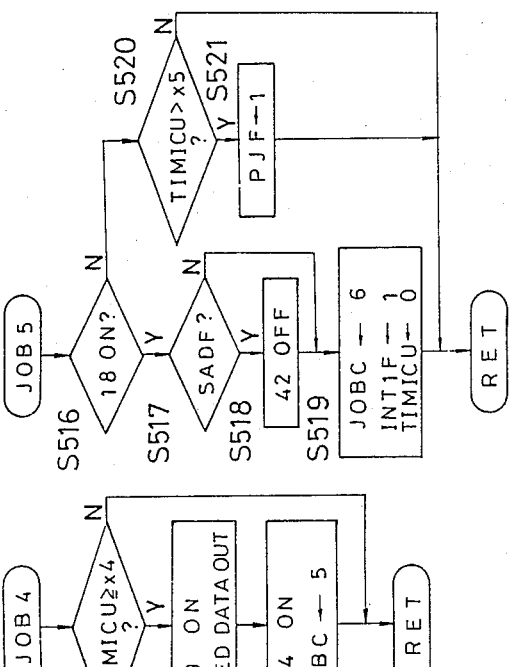
FIG. 5H
FIG. 5G
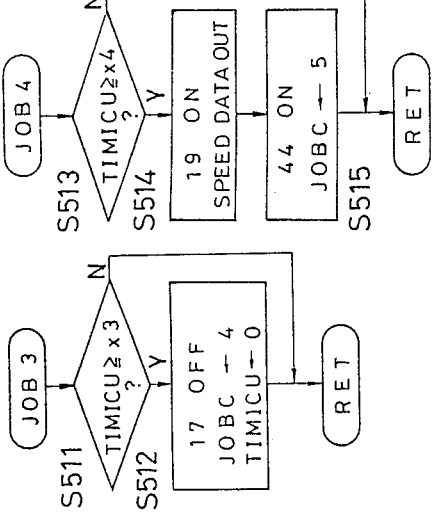
FIG. 5F

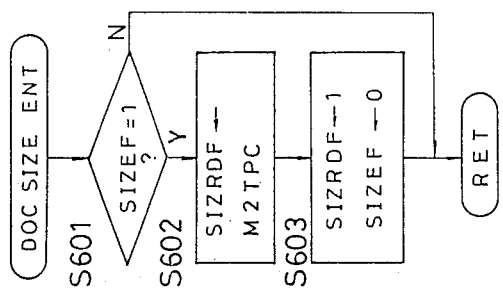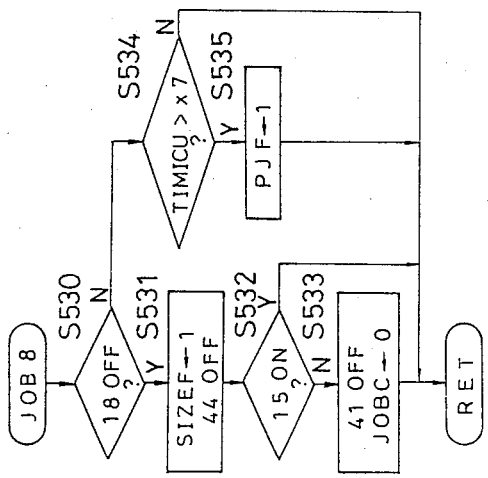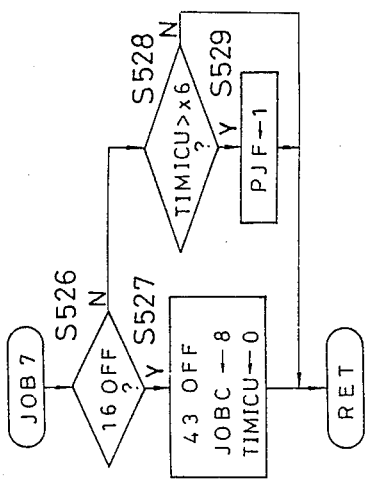

COPYING APPARATUS HAVING AUTOMATIC DOCUMENT FEEDER

BACKGROUND OF THE INVENTION

The present invention generally relates to copying apparatuses having automatic document feeders, and more particularly to a copying apparatus provided with an automatic document feeder and an optical scanning device wherein a document feeding direction of the automatic document feeder on a contact glass of the copying apparatus is opposite to a scanning direction of the optical scanning device.

The conventional copying apparatus is provided with a contact glass having such a size that a document of size A3 can be placed thereon sideways, due to reasons such as the frequency with which the documents of different sizes are copied, the design of the copying apparatus and the ease with which the copying apparatus may be operated. Normally, a maximum size of the document which can be copied is size A3, but in most cases, the documents which need to be copied are smaller than size A3. In addition, if the document were to be fed along a direction perpendicular to a longitudinal direction of the document, that is, along the shorter side, it would be necessary to provide means for feeding the document across the longer side of the document to ensure smooth feeding. Furthermore, it would be difficult to accurately guide the document along the shorter side.

On the other hand, when the document is fed along the longitudinal direction of the document, the means for feeding the document only needs to be provided across the shorter side of the document, and a more accurate guidance of the document is possible along the longer side of the document. For these reasons, the copying apparatus is designed so that the document having the maximum size is fed along the longitudinal direction of the document and placed on the contact glass sideways.

Hence, in virtually all of the copying apparatuses, the copying operation is carried out by feeding both the document and the copying paper from the right to left along the longitudinal direction of the contact glass, for example, so as to simplify the construction. In such a copying apparatus, it is easiest from the point of design to make an optical scanning device scan the document along a scanning direction by moving from the left to right. In this case, the document is set on the contact glass by aligning the left side of the document to a reference line or position of the contact glass. Usually, the reference line is the left side of the contact glass.

When automatically feeding the document by use of an automatic document feeder, the document cannot be set correctly on the contact glass unless each document is fed to such a position that the left side of the document becomes aligned to the reference line of the contact glass, regardless of the size of the document. For this reason, a time it takes for the automatic document feeder to set a document on the contact glass from a time when the feeding of the document may be started (hereinafter simply referred to as a document setting time) must be set to a document setting time for the document having the maximum size which is usually size A3, regardless of the size of the document which is actually fed and copied. As a result, when the automatic document feeder feeds documents having sizes smaller than the maximum size, there is an unnecessary time loss in that the document setting time is longer than what is actually required. Therefore, there is a problem in that a number of documents which can be copied per unit time by use of the automatic document feeder is small.

SUMMARY OF THE INVENTION

Accordingly, it is a general object of the present invention to provide a novel and useful copying apparatus having an automatic document feeder, in which the problems described heretofore are eliminated.

Another and more specific object of the present invention is to provide a copying apparatus having an automatic document feeder, in which a document setting time is variable by automatically changing a home position of a document on a contact glass depending on the size of the document.

Still another object of the present invention is to provide a copying apparatus comprising an automatic document feeder, document size detecting means provided on the automatic document feeder for detecting a size of a document, a contact glass on which the document is set automatically by the automatic document feeder, stopping position control means for controlling a stopping position of the document on the contact glass depending on the size of the document detected in the document size detecting means, an optical scanning device for scanning the document on the contact glass, and scanning range control means for controlling a scanning range of the optical scanning device depending on the stopping position of the document. According to the copying apparatus of the present invention, a number of documents which can be copied per unit time by use of the automatic document feeder is increased considerably compared to the conventional copying apparatus because a document setting time is variable depending on the size of the document.

Other objects and further features of the present invention will be apparent from the following detailed description when read in conjunction with the accompanying drawings.

BRIEF DESCRIPTION OF THE DRAWINGS

FIG. 5A is a flow chart showing a document feed check subroutine;

FIGS. 5B through 5K are flow charts showing a document feed subroutine;

FIGS. 6A and 6B are flow charts respectively showing a document size entering subroutine and a document size check subroutine;

DETAILED DESCRIPTION

Figure 1:
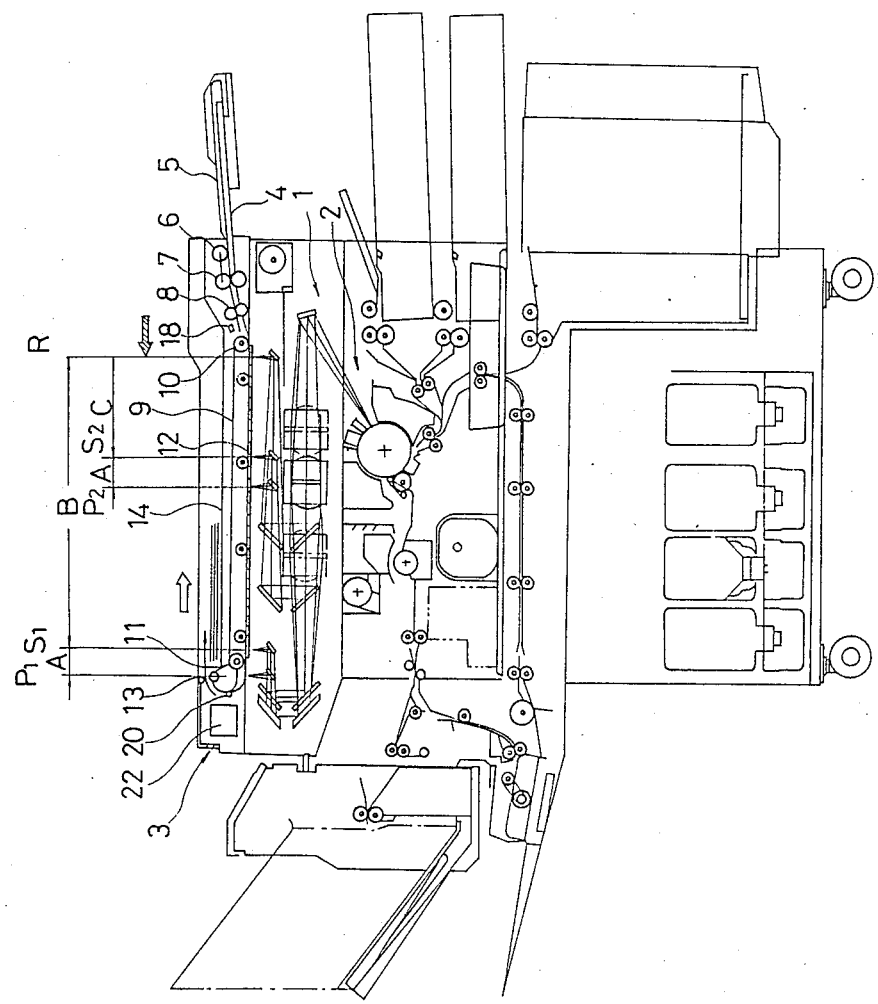
FIG. 1 is a general side view in partial cross section showing an embodiment of the copying apparatus accord to the present invention.

FIG. 1 generally shows an embodiment of the copying apparatus according to the present invention. The copying apparatusggenerally comprises a main body having a known construction and an automatic document feeder 3 fixed on the main body. The main body is roughly made up of an optical scanning device 1 and an image forming device 2 including a photosensitive drum.

Figure 2:
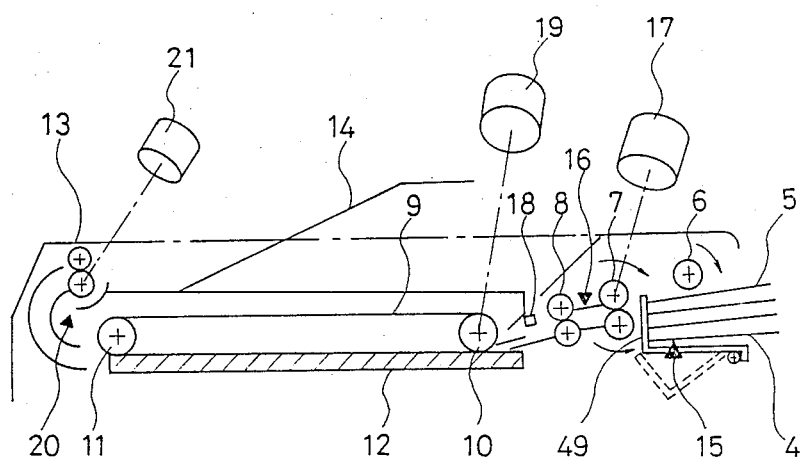
FIG. 2 shows an essential part of the copying apparatus for explaining an automatic document feeder of the copying apparatus.

The automatic document feeder 3 comprises a document feed tray 4 as shown in FIGS.1 and 2, and one or a plurality of documents 5 are placed on the document feed tray 4.

The documents 5 are drawn in by a draw-in roller 6, and one document 5 is separated by a pair of separating rollers 7 and fed towards a contact glass 12.

The document 5 supplied from the separating rollers 7 passes a tip end detecting sensor 16, a pair of pull-out rollers 8 and a resist sensor 18, and reaches a transporting belt 9. The document 5 is thus transported on the contact glass 12 by the transporting belt 9. This transporting belt 9 is provided across a belt driving roller 10 and a following roller 11.

The document 5 which is ejected by the transport belt 9 after the document 5 is scanned passes through a guide path and and the side of the document 5 is reversed as it is ejected upwardly. The document 5 is finally ejected by a pair of ejecting rollers 13 onto a document output tray 14 located above the transporting belt 9. The document 5 is detected by an ejecting document sensor 20 as it passes the guide path.

The document output tray 14 is inclined so that rear sides of the ejected documents 5 become aligned automatically.

A first motor 17 is provided to drive the separating rollers 7, a second motor 19 is provided to drive the belt driving roller 10, and a third motor 21 is provided to drive the ejecting rollers 13.

Figure 3:
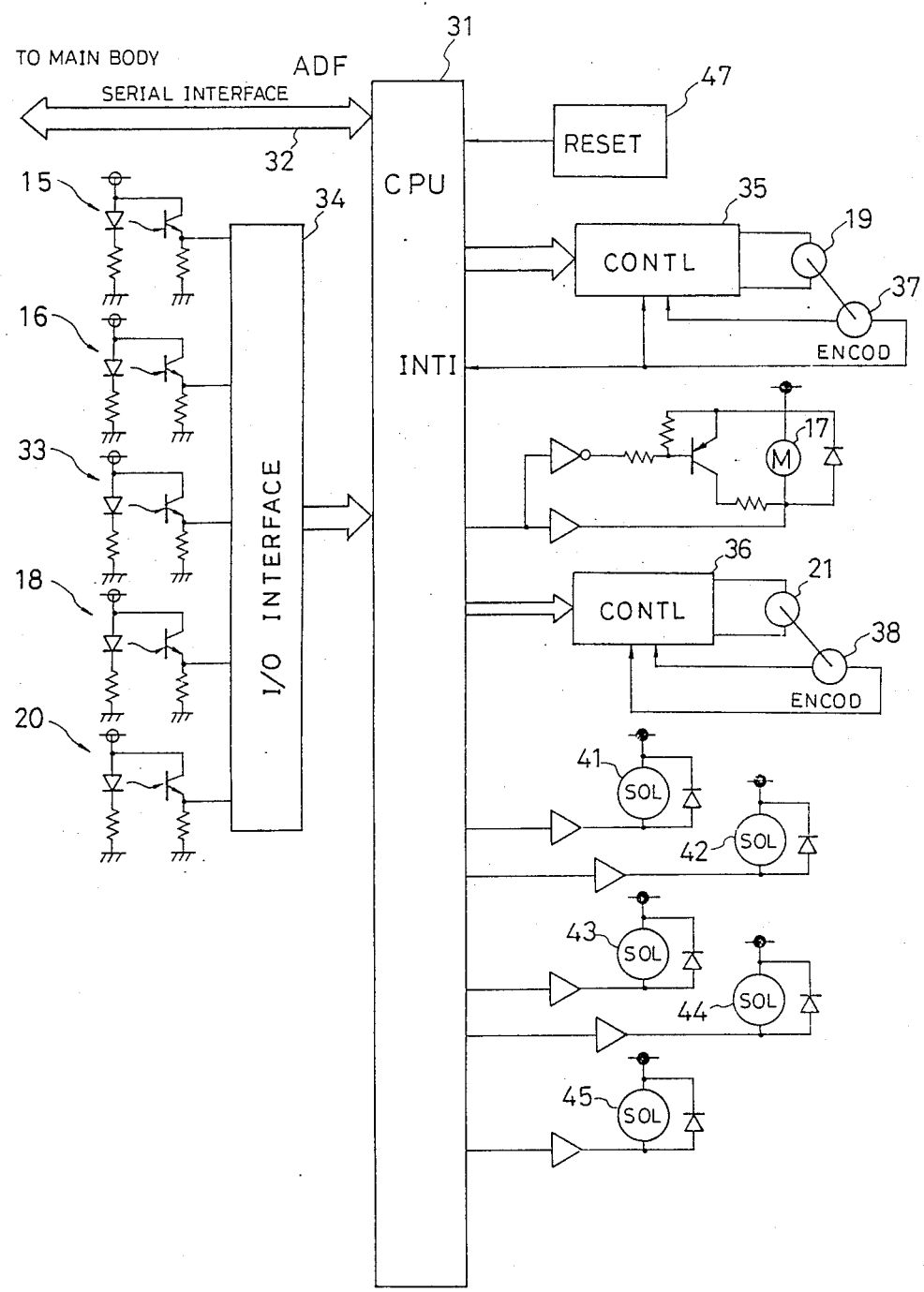
FIG. 3 is a system circuit diagram showing an embodiment of a control device of the copying apparatus.

A starting position control device 22 is provided in the automatic document feeder 3, and an embodiment of the control device 22 is shown in FIG. 3.

In FIG. 3, a central processing unit (hereinafter referred to as a CPU) 31 is coupled to a control device (not shown) of the main body through a serial interface 32. The CPU 31 is also coupled to a set sensor 15, the tip end detecting sensor 16, a lateral size detecting sensor 33 (not shown in FIGS. 1 and 2), the resist sensor 18 and the ejecting document sensor 20 through an input/output interface 34. Hence, output detection signals of these sensors 15, 16, 33, 18 and 20 can be entered into the CPU 31.

A reset circuit 47 resets the CPU 31 when a power source (not shown) is turned ON.

The first motor 17 is coupled to the CPU 31 and is controlled and driven by an instruction from the CPU 31.

The second and third motors 19 and 21 are coupled to the CPU 31 through respective servo controllers 35 and 36, and are controlled and driven by the respective servo controllers 35 and 36 in response to instructions from the CPU 31. Rotations of the second and third motors 19 and 21 are detected in respective encoders 37 and 38 and fed back to the respective servo controllers 35 and 36.

Solenoids 41 through 45 are coupled to the CPU 31 and are operated responsive to respective instructions from the CPU 31. The solenoid 41 controls a setting claw 49 which acts as a stopper when the document 5 is set on the contact glass 12, and the setting claw 49 is released as indicated by a phantom line during the feeding of the document 5 when the solenoid 41 is operated. The solenoid 42 controls the draw-in roller 6, and the draw-in roller 6 is moved to a draw-in position for drawing in the documents 5 when the solenoid 42 is operated. The solenoid 43 controls the separating rollers 7, and operation of the separating rollers 7 is cancelled when the solenoid 43 is operated. The solenoid 44 controls a clutch (not shown) which operates the pull-out rollers 8, and the solenoid 45 controls a reversing mechanism (not shown) which reverses the side of the document 5 and feeds the reversed document 5 back onto the contact glass 12 so that the reverse side may be copied.

When feeding the document 5, the size of the document 5 is stored in the CPU 31 as a document size detection signal indicative of the length of the document 5 along the feeding direction. The document size detection signal is produced from an output detection signal of the resist sensor 18, for example.

It will be assumed for convenience' sake that there are two document stopping positions on the contact glass 12 and these document stopping positions are selectable for a document having size A3 and a document having size A4, respectively. In this case, when the document 5 is larger than size A4 but is smaller than or equal to size A3, the left side of the document 5 is stopped at a home position $S_1$ shown in FIG. 1. On the other hand, when the document 5 is smaller than or equal to size A4, the left side of the document 5 is stopped at a home position $S_2$ shown in FIG. 1. The home position $S_2$ is located an an approximate center of the contact glass 12.

A home position of the optical scanning device 1 also changes when the home positinn of the document 5 changes. In FIG. 1, the optical scanning device 1 has a home position $P_1$ with respect to the home position $S_1$ of the document 5, and this home position $P_1$ is a pre-run distance A on the left of the left side of the document 5 in the home position $S_1$. Similarly, the optical scanning devie 1 has a home position $P_2$ with respect to the home position $S_2$ of the document 5, and this home position $P_2$ is the pre-run distance A on the left of the left side of the document 5 in the home position $S_2$.

As indicated by a hatched arrow in FIG. 1, the document 5 is fed in a document feeding direction from the right to left. However, as indicated by an arrow, the optical scanning device 1 scans the document 5 on the contact glass 12 in a direction opposite to the document feeding direction. In other words, the optical scanning device 1 scans the document 5 by moving from the home position $P_1$ or $P_2$ to a return position R and then returns to the home position.

Although only two home positions are selectable in the present embodiment, it is possible to provide three or more home positions for the documents of difference sizes. In such a case, the optical scanning device 1 will have a number of home positions corresponding to the number of home positions of the document 5.

During an automatic document feed (ADF) mode or a semi-automatic document feed (SADF) mode of the automatic document feeder 3, the document 5 set on the document feed tray 4 is fed automatically to a predetermined position on the contact glass 12 by the operation of the draw-in roller 6, the pull-out rollers 8 and the transporting belt 9. A plurality of documents 5 are set on the document feed tray 4 in the case of the ADF mode, and only one document 5 is set on the document feed tray 4 in the case of the SADF mode. The length of the document 5 along the document feeding direction is detected as a pulse signal based on the rotation of the second motor 19, for example. In other words, the length is discriminated from a number of timing pulses obtained from the encoder 37 between times when the resist sensor 18 detects the tip and rear sides of the document 5, for example, and a size signal indicative of the length is produced in the CPU 31. The stopping position control device 22 selects the stopping position of the document 5 based on a combination of the size signal and an output detection signal of the lateral size detecting sensor 33 which detects whether or not the lateral length of the document 5 is over a predetermined length. The second motor 19 is stopped when the number of timing pulses obtained from the encoder 37 reaches a value corresponding to the selected position, for example. For example, the document 5 having a length along the document feeding direction greater than or equal to that of size A4 is stopped at the home position $S_1$, while the document 5 having a length along the document feeding direction less than that of size A4 is stopped at the home position $S_2$.

The information on the stopping position obtained from the stopping position control device 22 is entered into the optical scanning device 1 of the copying apparatus, and an exposure control device (not shown) moves the optical scanning device 1 to the selected home position $P_1$ or $P_2$ in correspondence with the home position of the document 5.

The optical scanning device 1 optically scans the document 5 on the contact glass 12 by moving from the home position $P_1$ or $P_2$ to the return position R.

In the case where the documents 5 are fed successively, each document 5 is stopped at the appropriate home position depending on the size of the document 5, and the scanning is carried out for each document 5.

Since the stopping position of the document 5 changes depending on the size of the document 5, a positioning of the copying paper is also controlled depending on the home position of the document 5. A transmission of the data related to the document size information or the stopping position information to the main body is carried out by a main routine of the CPU 31 shown in FIG. 4.

Figure 4:
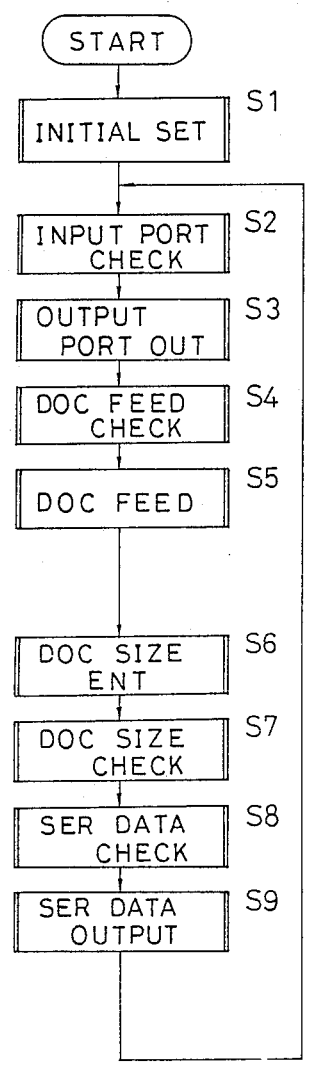
FIG. 4 is a flow chart showing an embodiment of a main routine of the control device.

In FIG. 4, a step $S_1$ carries out an initial setting. A step $S_2$ carries out an input port check subroutine which checks the input information to the CPU 31 such as the state of the sensors, a step S3 carries out an output port OUT subroutine which outputs the output information from the CPU 31 to the servo controllers and the like, a step S4 carries out a document feed check subroutine which checks whether or not the document 5 is placed on the document feed tray 4 and the document 5 is to be fed, a step S5 carries out a document feed subroutine which controls the feeding of the document 5, a step S6 carries out a document size entering subroutine which enters the pulses indicative of the length of the document 5, a step S7 carries out a document size check subroutine which checks the size of the document 5, a step S8 carries out a serial data check subroutine which checks the serial data to be supplied to the main body from the CPU 31, and a step S9 carries out a serial data output subroutine which outputs the serial data to the main body.

FIGS. 5A through 5K show the processes carried out from the time when the document 5 is placed on the document feed tray 4 to the time when the document 5 passes the resist sensor 18. FIG. 5A shows the document feed check subroutine carried out in the step S4 shown in FIG. 4, and FIGS. 5B through 5K show the document feed subroutine carried out in the step S5 shown in FIG. 4.

In FIG. 5A, a step S401 discriminates whether the automatic document feeder 3 is in the ADF mode or the SADF mode, and the process returns to the main routine when the discrimination result in the step S401 is NO. On the other hand, when the discrimination result in the step S401 is YES, a step S402 discriminates whether or not the set sensor 15 is ON, that is, whether or not the document 5 is set on the document feed tray 4. A step S403 discriminates whether or not a document feed signal is received when the discrimination result in the step S402 is YES. The document feed signal is received when a print (or copy) button (not shown) is pushed to instruct a start of the copying operation. A step S404 discriminates whether or not a document feed start flag DFSF is set to "1" when the discrimination result in the step S403 is YES. It is indicated that the feeding of the document 5 may be started when the document feed start flag DFSF is set to "1", A step S405 discriminates whether the automatic document feeder 3 is in the ADF mode when the discrimination result in the step S404 is NO. The process returns to the main routine when the discrimination result in the step S402 or S403 is NO, and also when the discrimination result in the step S404 is YES.

When the discrimination result in the step S405 is NO and the SADF mode is selected, a step S406 turns the solenoid 43 ON because there is not need to operate the separating rollers 7, and the process advances to a step S407 and the separating rollers 7 are maintained in the operating state. On the other hand, when the discrimination result in the step S405 is YES, the process jumps to the step S407. The step S407 turns the solenoids 41 and 42 ON to start feeding the document 5, sets the document feed start flag DFSF to "1", a routine JOBC is set to "1" (that is, JOB1) and an internal timer counter TIMICU of the CPU 31 is reset to "0", In the document feed subroutine, the process shown in FIG. 5B is carried out. A step S501 discriminates the routine JOBC, and routines JOB0 through JOB8 shown in FIGS. 5C through 5K are carried out depending on the routine JOBC.

In the routine JOB0 shown in FIG. 5C, the process is simply returned to the main routine.

In the routine JOB1 shown in FIG. 5D, a step S502 discriminates whether or not a count of the timer counter TIMICU has exceeded a predetermined value X1. When the discrimination result in the step S502 is YES, a step S503 turns the first motor 17 ON, sets the routine JOBC to "2" (that is, JOB2) and resets the timer counter TIMICU to "0", The process returns to the main routine when the discrimination result in the step S502 is NO, and returns to the document feed subroutine after the step S503 to then move to the routine JOB2.

In the routine JOB2 shown in FIG. 5E, a step S504 discriminates whether or not the tip end detecting sensor 16 is ON and has detected the document 5 fed by the routine JOB1. When the discrimination result in the step S504 is YES, a step S505 turns the solenoid 43 ON to cancel the operation of the separating rollers 7. A step S506 discriminates whether or not the automatic document feeder 3 is in the SADF mode. When the discrimination result in the step S506 is NO, a step S507 turns the solenoid 42 OFF so as to cancel the operation of the draw-in roller 6. On the other hand, when the discrimination result in the step S506 is YES or after the step S507, a step S508 sets the routine JOBC to "3" (that is, JOB3), and resets the timer counter TIMICU to "0", On the other hand, when the discrimination result in the step S504 is NO, a step S509 discriminates whether or not the timer counter TIMICU is greater than a predetermined value X2. When the discrimination result in the step S509 is YES, a step S510 sets a paper jam flag PJF to "1", In other words, when the tip end detecting sensor 16 does not detect the document 5 even when a predetermined time elapses after the first motor 17 is driven, that is, when the tip end detection sensor 16 does not detect the document 5 even when the timer counter TIMICU exceeds the predetermined value X2, the paper jam is detected and informed to the operator by setting the paper jam flag to "1", The process returns to the main routine when the discrimination result in the step S509 is NO or after the S510. The process returns to the document feed subroutine after the step S508 to then move to the routine JOB3.

In the routine JOB3 shown in FIG. 5F, a step S511 discriminates whether or not the timer counter TIMICU is greater than or equal to a predetermined value X3. When the discrimination result in the step S511 is YES, a step S512 turns the first motor 17 OFF, sets the routine JOBC to "4" (that is, JOB4) and resets the timer counter TIMICU to "0", The process returns to the main routine when the discrimination result in the step S511 is NO, and returns to the document feed subroutine after the step S512 to then move to the routine JOB4.

In the routine JOB4 shown in FIG. 5G, a step S513 discriminates whether or not the timer counter TIMICU is greater than or equal to a predetermined value X4. When the discrimination result in the step S513 is YES, a step S514 turns the second motor 19 ON and outputs a speed data of the second motor 19. A step S515 turns the solenoid 44 ON and set the routine JOBC to "5" (that is, JOB5). The process returns to the main routine when the discrimination result in the step S513 is NO, and returns to the document feed subroutineaafter the step S515 to then move to the routine JOB5.

In the routine JOB5 shown in FIG. 5H, a step S516 discriminates whether or not the resist sensor 18 is ON. When the document 5 passes and turns the resist sensor 18 ON and the discrimination result in the step S516 is YES, a step S517 discriminates whether the automatic document feeder 3 is in the SADF mode. When the discrimination result in the step S517 is YES, a step S518 turns the solenoid 42 OFF. On the other hand, when the discrimination result in the step S517 is NO or after the step S518, a step S519 sets the routine JOBC to "6" (that is, JOB6), sets an interrupt flag INTIF to "1" and resets the timer counter TIMICU to "0", When the discrimination result in the step S516 is NO, a step S520 discriminates whether or not the timer counter TIMICU is greater than a predetermined value X5. A step S521 sets the paper jam flag PJF to "1" when the discrimination result in the step S520 is YES. The process returns to the main routine when the discrimination result in the step S520 is NO or after the step S521. The process returns to the document feed subroutine after the step S519 to then move to the routine JOB6.

In the routine JOB6 shown in FIG. 5I, a step S522 resets a size sensor flag SIZSNF to "0", A step S523 discriminates whether or not the lateral size detecting sensor 33 is ON. When the discrimination result in the step S523 is YES, a step S524 sets the size sensor flag SIZSNF to "1", When the discrimination result in the step S523 is NO or after the step S524, a step S525 sets the routine JOBC to "7" (that is, JOB7). The process returns to the document feed subroutine after the step S525 to then move to the routine JOB7.

In the routine JOB7 shown in FIG. 5J, a step S526 discriminates whether or not the tip end detecting sensor 16 is OFF. When the discrimination result in the step S526 is YES, a step S527 turns the solenoid 43 OFF, sets the routine JOBC to "8" (that is, JOB8) and resets the timer counter TIMICU to "0", On the other hand, when the discrimination result in the step S526 is NO, a step S528 discriminates whether or not the timer counter TIMICU is greater than a predetermined value X6. When the discrimination result in the step S528 is YES, a step S529 sets the paper jam flag PJF to "1", The process returns to the main routine when the discrimination result in the step S528 is NO or after the step S529. The process returns to the document feed subroutine after the step S527 to then move to the routine JOB8.

In the routine JOB8 shown in FIG. 5K, a step S530 discriminates whether or not the resist sensor 18 is OFF. When the discrimination result in the step S530 is YES, a step S531 sets a size measurement end flag SIZEF to "1" and turns the solenoid 44 OFF. A step S532 discriminates whether or not the set sensor 15 is ON, and a step S533 turns the solenoid 41 OFF and sets the routine JOBC to "0" (that is, JOB0) when the discrimination result in the step S532 is NO. On the other hand, when the discrimination result in the step S530 is NO, a step S534 discriminates whether or not the timer counter TIMICU is greater than a predetermined value X7. When the discrimination result in the step S534 is YES, a step S535 sets the paper jam flag PJF to "1", The process returns to the main routine when the discrimination result in the step S532 is YES, the discrimination result in the step S534 is NO, or after the step S535. But the process returns to the document feed subroutine after the step S533 to then move to the routine JOB0. In other words, when the next document 5 is on the document feed tray 4 and the set sensor 15 is ON, the process returns to the main routine so as to carry out operations similar to those described heretofore for this next document 5. But when the set sensor 15 is OFF, the solenoid 41 is turned OFF so that the document 5 cannot be fed, and the process returns to the routine JOB0.

Figure 6B:
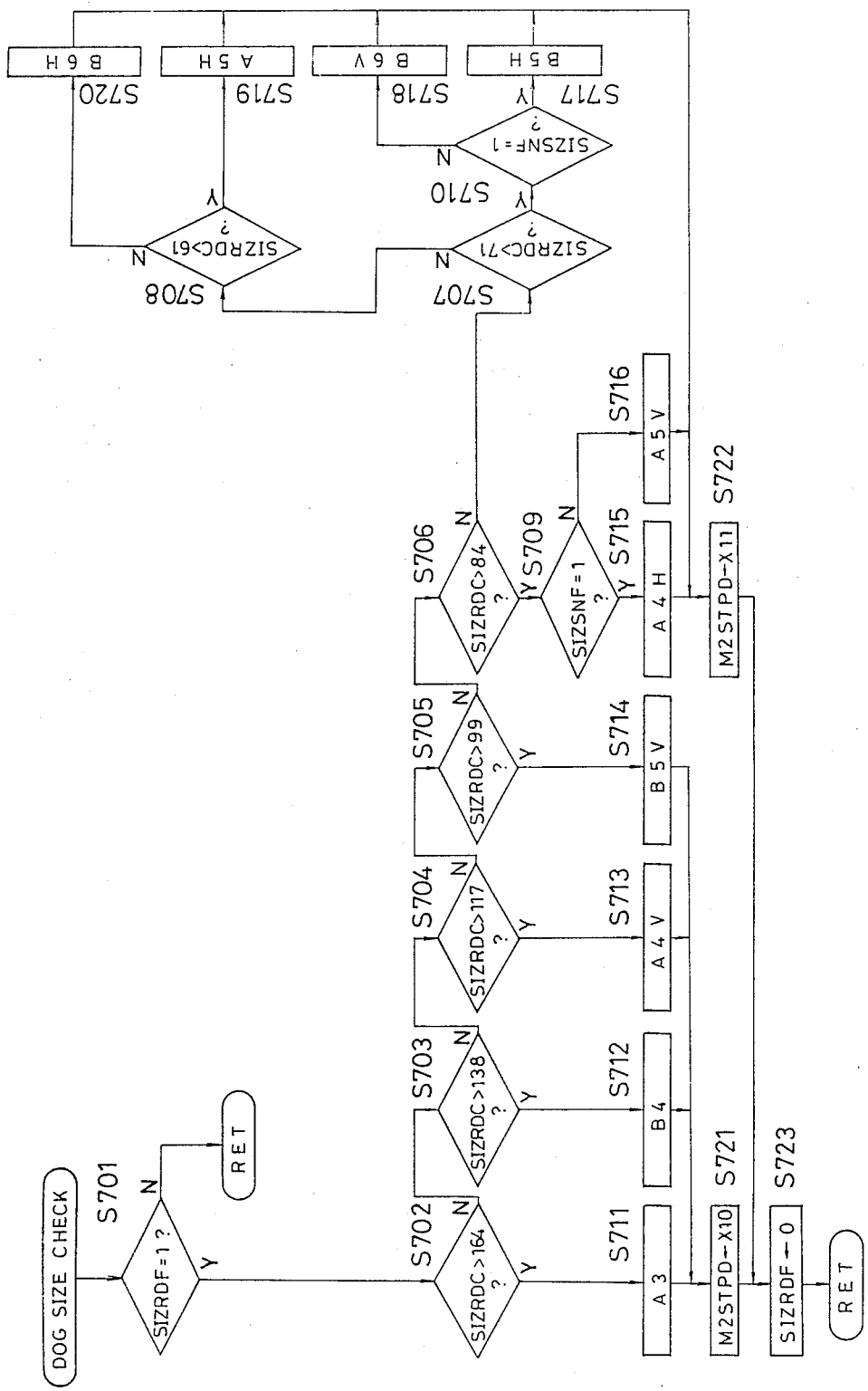

Next, a description will be given on the document size entering subroutine S6 and the document size check subroutine S7 shown in FIG. 4, by referring to FIGS. 6A and 6B. FIG. 6A shows the document size entering subroutine S6, and FIG. 6B shows the document size check subroutine S7.

In FIG. 6A, a step S601 discriminates whether or not the size measurement end flag SIZEF is set to "1", When the size measurement end flag SIZEF is set to "1" in the routine JOB6 or JOB8 described before and the discrimination result in the step S601 is YES, a step S602 reads a number of timing pulses M2TPC of the second motor 19 obtained from the encoder 37 as a count of an internal size reading counter SIZRDC of the CPU 31. A step S603 sets a size reading flag SIZRDF to "1" and resets the size measurement end flag SIZEF to "0", The process is returned to the main routine when the discrimination result in the step S601 is NO or after the step S603.

In FIG. 6B, a step S701 discriminates whether or not the size reading flag SIZRDF is set to "1", When the discrimination result in the step S701 is NO, the process is returned to the main routine. On the other hand, when the discrimination result in the step S701 is YES, steps S702 through S708 discriminate the count of the size reading counter SIZRDC. When the count of the size reading counter SIZRDC is greater than 164 in the step S702, the size of the document 5 is discriminated as being A3 and this size information is supplied to the main body of the copying apparatus. Similarly, when the count of the size reading counter SIZRDC is greater than 138 in the step S703, greater than 117 in the step S704 and greater than 99 in the step S705, the size of the document 5 is discriminated as being B4, vertically long A4 (A4V) and vertically long B5 (B5V), respectively, and the respective size information is supplied to the main body.

On the other hand, when the count of the size reading counter SIZRDC is greater than 84 in the step S706, a step S709 discriminates whether or not the size sensing flag SIZSNF is set to "1", When the discrimination result in the step S709 is YES, the size of the document 5 is discriminated as being horizontally long A4 (A4H). When the discrimination result in the step S709 is NO, the size of the document 5 is discriminated as being vertically long A5 (A5V).

When the count of the size reading counter SIZRDC is greater than 71 in the step S707, a step S710 discriminates whether or not the size sensing flang SIZSNF is set to "1", When the discrimination result in the step S710 is YES, the size of the document 5 is discriminated as being horizontally long B5 (B5H). When th ediscrimination result in the step S710 is NO, the size of the document 5 is discriminated as being vertically long B6 (B6V).

When the count of the size reading counter SIZRDC is greater than 61 in the step S708, the size of the document 5 is discriminated as being horizontally long A5 (A5H). When the discrimination result in the step S708 is NO, the size of the document 5 is discriminated as being horizontally long B6 (B6H).

The step S711 through S720 inform the discriminated size of the document 5 to the main body. After one of the steps S711 through S714, that is, when the size of the document 5 is within a range from size B5V to A3, a step S721 sets a predetermined value X10 into a second motor stopping data M2STPD. After one of the steps S715 through S720, that is, when the size of the document 5 is size A4H or smaller, a step S722 sets a predetermined value X11 into the second motor stopping data M2STPD. Hence, when the second motor stopping data M2STPD is X10, the second motor 19 is stopped so that the document 5 stops at the home position $S_1$ shown in FIG. 1. On the other hand, when the second motor stopping data M2STPD is X11, the second motor 19 is stopped so that the document 5 stops at the home position $S_2$.

The second motor stopping data M2STPD is set to more than two values when more than two home positions are provided for the document 5.

Finally, a step S723 resets the size reading flag SIZRDF to "0", and process is returned to the main routine.

Figure 7B:
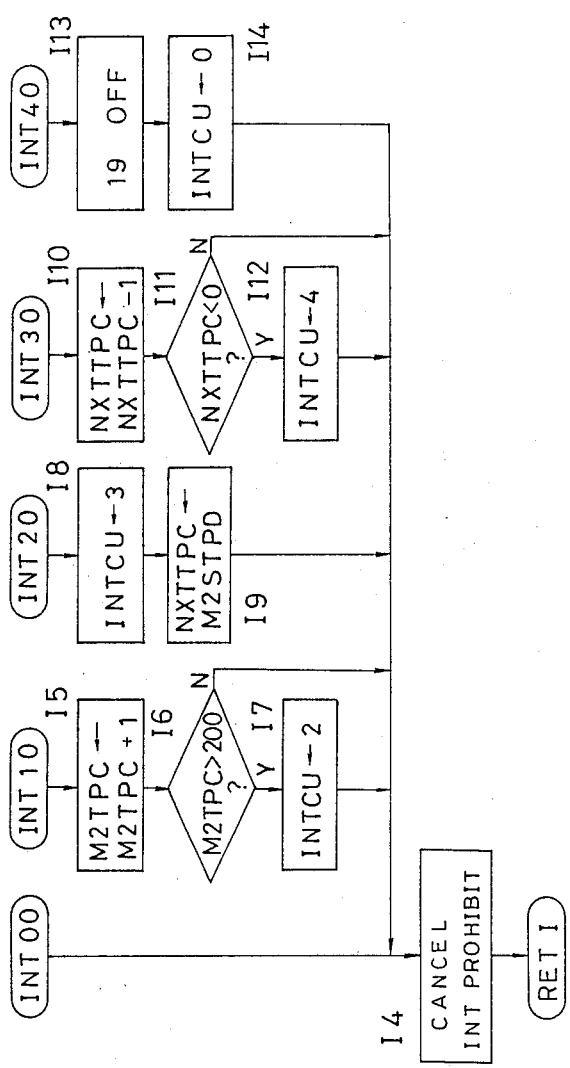
FIGS 7A and 7B are flow charts respectively showing an interrupt routine.
Figure 7A:
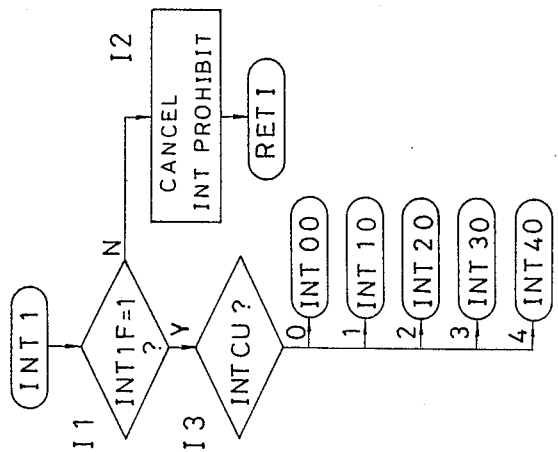

The output pulse signal (timing pulses) of the encoder 37 which is used to produce the second motor stopping data M2STPD is applied to an interrupt terminal INT1 fo the CPU 31 as in interrupt information. FIGS. 7A and 7B show an embodiment of the interrupt routine.

In FIG. 7A, a step I1 discriminates whether or not an interrupt flang INT1F is set to "1", that is, whether or not the timing pulse from the encoder 37 is received. When the discrimination result in the step I1 is NO, a step I2 cancels interrupt prohibit, and the process is returned to the original process before the interrupt. On the other hand, when the discrimination result in the step I1 is YES, a step I3 discriminates a routine INTCU, and routines INT00 through INT40 shown in FIG. 7B are carried out depending on the routine INTCU. The routine INTCU is initially set to "0" (that is, INT00), and thus, the routine INT00 is first carried out.

In FIG. 7B, a step I4 cancels the interrupt prohibit in the routine INT00.

In the case of the routine INT10, a step I5 increments the second motor stopping data M2STPD, and a step I6 discriminates whether or not the second motor stopping data M2STPD is greater than a predetermined value which is 200, for example. When the discrimination result in the step I6 is YES, a step I7 sets the interrupt routine INTCU to "2" (that is, INT20). When the discrimination result in the step I6 is NO or after the step I7, the process advances to the step I4 described before.

In the case of the routine INT20, a step I8 sets the routine INTCU to "3" (that is, INT30), and a step I9 sets the second motor stopping data M2STPD as a count of a stop timing counter NXTTPC. For example, the value X10 or X11 is set as the stop timing counter NXTTPC. The process advances to the step I4 after the step I9.

In the case of the routine INT30, a step I10 decrements the stop timing counter NXTTPC, and a step I11 discriminates whether or not the stop timing counter NXTTPC is less than zero. When the discrimination result in the step I11 is YES, a step I12 sets the routine INTCU to "4" (that is, INT40). When the discrimination result in the step I11 is NO or after the step I12, the process advances to the step I4.

In the case of the routine INT40, a step I13 turns the second motor 19 OFF to stop the feeding of the document 5, and a step I14 sets the routine INTCU to "0" (that is, INT00). The process advances to the step I4 after the step I14.

In the step I6, the predetermined value (for example, 200) is selected so that the count of the stop timing counter NXTTPC is zero at a time when the document 5 reaches such a position that the document 5 may be finally stopped at a predetermined home position on the contact glass 12.

Therefore, according to the present invention, the document setting time is reduced for documents having a size smaller than the maximum size in the case of the SADF mode. In addition, the number of documents which can be copied per unit time by use of the automatic document feeder is increased considerably in the case of the ADF mode, because the document setting time is variable depending on the size of each document.

Further, the present invention is not limited to these embodiments, but various variations and modifications may be made without departing from the scope of the present invention.

What is claimed is:

1. A copying apparatus comprising:
   an automatic document feeder for feeding a document in a document feeding direction;
   document size detecting means provided on said automatic document feeder for detecting a size of the document;
   a contact glass on which the document is set automatically by said automatic document feeder;

stopping position control means for controlling a stopping position of the document on said contact glass depending on the size of the document detected in said document size detecting means;

an optical scanning device for scanning the document on said contact glass in a scanning direction which is opposite to the document feeding direction; and scanning range control means for controlling a scanning range of said optical scanning device depending on the stopping position of the document.

2. A copying apparatus as claimed in claim 1 in which said document size detecting means comprises a resist sensor, said resist sensor outputting a signal indicative of a length of the document along the document feeding direction.

3. A copying apparatus as claimed in claim 1 in which said stopping position control means controls the stopping position of the document on said contact glass to one of a plurality of predetermined home positions on said contact glass depending on the size of the document detected in said document size detecting means.

4. A copying apparatus a sclaimed in claim 3 in which said scanning range control means controls the scanning range of said optical scanning device to one of a plurality of scanning ranges depending on the stopping position of the document, each of said plurality of scanning ranges being set in correspondence with a corresponding one of said plurality of predetermined home positions.

5. A copying apparatus as claimed in claim 3 in which said plurality of predetermined home positions comprises at least a first home position and a second home position, said first home position being a stopping position of a document having a size greater than a first size and up to a second size, said second home position being a stopping position of a document having a size smaller than or equal to said first size, said second size being a maximum size of a document which may be set on said contact glass.

6. A copying apparatus as claimed in claim 5 in which said first and second sizes are A4 and A3, respectively.

7. A copying apparatus as claimed in claim 1 in which said automatic document feeder comprises a document feed tray on which a plurality of documents are set in an automatic document feed mode and only one document is set in a semi-automatic document feed mode, said plurality of documents set on said document feed tray being successively fed automatically by said automatic document feeder one by one in said automatic document feed mode.

8. A copying apparatus as claimed in claim 7 in which said document size detecting means detects the size of each of said plurality of documents fed successively by said automatic document feeder in said automatic document feed mode, so that said scanning range control means successively controls the scanning range of said optical scanning device depending on the stopping position of each of said plurality of documents.

9. A copying apparatus as claimed in claim 1 in which said stopping position control means comprises a transporting belt for transporting the document on said contact glass, driving means including a motor for driving said transporting belt, and a stopping position control device for controlling said driving means depending on an output signal of said document size detecting means.

10. A copying apparatus as claimed in claim 9 in which said document size detecting means comprises an encoder for outputting timing pulses indicative of a rotation frequency of said motor, a resist sensor for outputting a signal indicative of a beginning and an end of the document along the document feeding direction, and processing means for detecting the size of the document based on a counted value of said timing pulses between the beginning and end of the document indicated by the output signal of said resist sensor.

11. A copying apparatus as claimed in claim 10 in which said document size detecting means further comprises a lateral size detecting sensor for detecting a length of the document along a direction perpendicular to the document feeding direction and for outputting a detection signal, said processing means detecting the size of the document also based on the output detection signal of said lateral size detecting sensor.

12. A copying apparatus as claimed in claim 1 in which said stopping position control means comprises a transporting belt for transporting the document on said contact glass, driving means including a motor for driving said transporting belt and a stopping position control device for controlling said driving means to stop the document at one of a plurality of home positions on said contact glass depending on the size of the document detected in said document size detecting means, said document size detecting means comprising an encoder for outputting timing pulses indicative of a rotation frequency of said motor, a resist sensor for outputting a signal indicative of a beginning and an end of the document along the document feeding direction and processing means for detecting the size of the document based on a counted value of said timing pulses between the begining and end of the document indicated by the output signal of said resist sensor.

13. A copying apparatus as claimed in claim 12 in which said processing means starts to count said timing pulses from a time when a feeding of the document by said automatic document feeder starts.

14. A copying apparatus as claimed in claim 12 in which said plurality of home positions comprise at least a first home position and a second home position, said first home position being a stopping position of a document having a size greater than a first size and up to a second size, said second home position being a stopping position of a document having a size smaller than or equal to said first size, said second size being a maximum size of a document which may be set on said contact glass, said stopping position control device controlling said driving means to stop the document at said first home position when the counted value of said timing pulses is less than or equal to a predetermined value and to stop the document at said second home position when the counted value of said timing pulses is greater than said predetermined value.

15. A copying apparatus as claimed in claim 14 in which said processing means starts to count said timing pulses from a time when a feeding of the document by said automatic document feeder starts.

* * * * *